June 14, 1927.

W. J. COULTAS

CLEVIS

Filed July 6, 1926

1,632,175

Witness
Milton Lenoir

Inventor:
Wilbur J. Coultas
W. C. Irdinston
Attorney

Patented June 14, 1927.

1,632,175

UNITED STATES PATENT OFFICE.

WILBUR J. COULTAS, OF MOLINE, ILLINOIS, ASSIGNOR TO DEERE & COMPANY, OF MOLINE, ILLINOIS, A CORPORATION OF ILLINOIS.

CLEVIS.

Application filed July 6, 1926. Serial No. 120,746.

My invention relates to draft devices and more particularly to clevises of the type shown and described hereinafter, and the object of my invention is the production of a clevis, preferably of wrought steel, simple in construction, effective in operation, and capable of resisting any strain to which it may be subjected.

Referring to the drawings in which similar numerals indicate identical parts:

Figure 1:
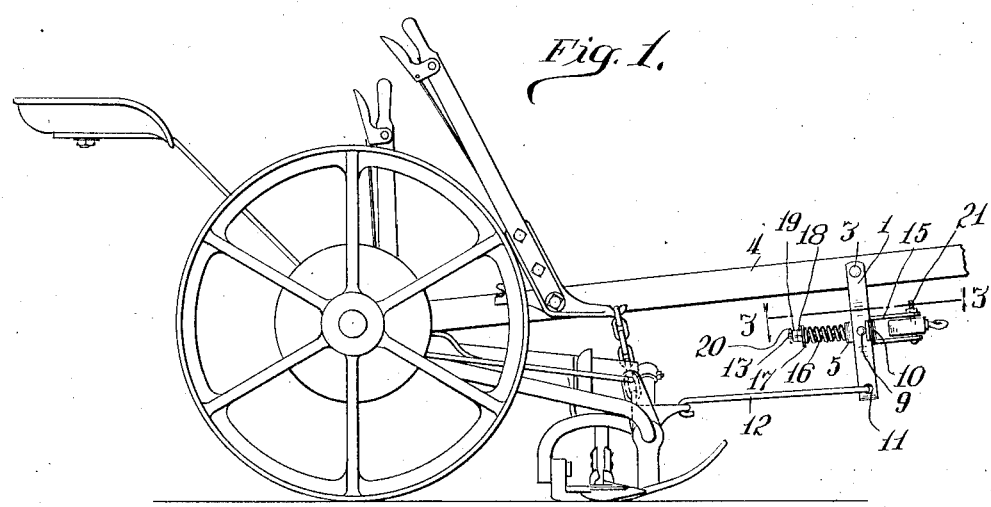
Figure 1 is a side elevation of a mower embodying my invention.
Figure 2:
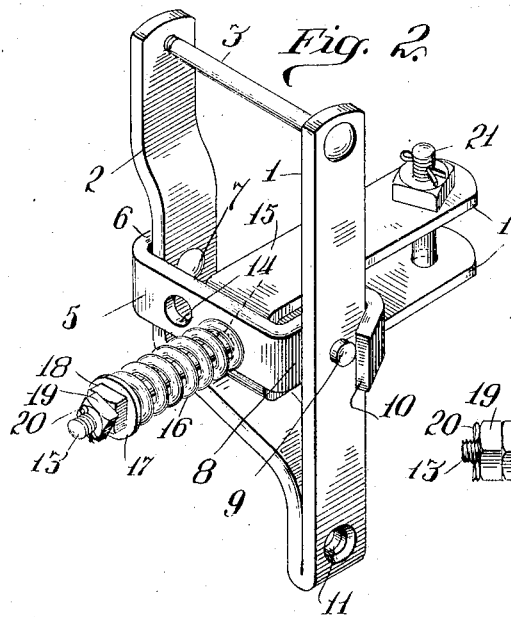
Figure 2 is an enlarged perspective view of the clevis.
Figure 3:
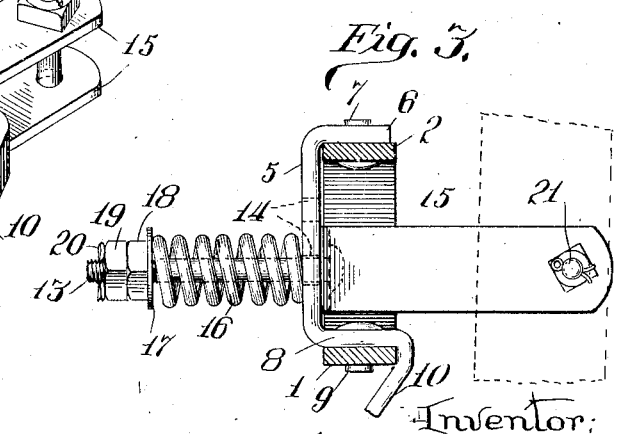
Figure 3 is an enlarged detail section on the line 3—3 of Figure 1.

The frame of the clevis consists of a bar bent to present arms 1 and 2 terminating in the same plane, and provided with holes for the reception of a bolt 3 by which the clevis is attached to the pole 4 of a mower. The arms 1 and 2 are spaced apart by a bar 5, one end 6 of which is bent to fit closely against the outer side of the bar 2 to which it is rigidly secured by a rivet 7. The opposite end portion 8 of the bar 6 is bent forwardly in parallelism with the end 6, and is rigidly secured to the inner side of the arm 1 by a rivet 9. The end of portion 8 extends forwardly from the arm 1 and is then bent rearwardly at an acute angle to the outer side of the arm 1 to form a stop 10 and is in contact with the forward edge of said arm. Below the bar 5, the arm 2 is bent to extend toward the arm 1, both arms at the juncture being pressed together and provided with a hole 11 for reception of a draft link 12, of the usual type, as commonly employed to connect the clevis with a mower. A bolt 13 projects through a hole 14 in the bar 5, shown in dotted lines in Fig. 3, and is attached to a yoke 15, extending forwardly from the bar 5 against which it is yieldingly held by a coiled spring 16, on the bolt 13, said spring exerting its force between the rear side of the bar 5 and a washer 17, on the bolt 13, which is secured in place by a nut 18 and a jam nut 19, a cotter 20, through the bolt 13, preventing the nuts turning in a loosening direction.

The arms of the yoke 15, one above the other, extend forwardly in parallelism, and are provided with holes through which passes the bolt 21 by which a double-tree is secured between the arms of the yoke and upon which it pivots, the stop 10 operating to limit swinging movement of a doubletree on its pivot to preserve a safe distance between the cutter bar and the near horse.

What I claim is:

1. A clevis including a frame having vertically disposed parallel arms; a bar extending from one arm to the other and secured to both arms, one end of said bar bent to form a stop outside of one of said arms; a yoke extending forwardly from said bar; a bolt in the apex of said yoke; a hole in said bar through which said bolt projects rearwardly, and a coiled spring on said bolt operating to hold said yoke resiliently in position.

2. A clevis including a frame having vertically disposed arms; one of said arms bent downwardly toward the other arm and joined thereto; a hole in both arms at their juncture; a bar extending from one arm to the other and rigidly secured thereto; one end of said bar bent rearwardly and outwardly to form a stop; a yoke extending forwardly from said bar and having its apex in contact therewith; a hole in said bar; a bolt in the apex of said yoke; a hole in said bar through which said bolt loosely projects rearwardly; a washer secured in place on the rearward end of said bolt; and a coiled spring on said bolt operating against said bar and washer to hold said yoke in operative position.

3. A clevis including a vertical frame formed from a bar bent upon itself to present parallel arms spaced apart; one of said arms bent intermediate its length downwardly to the other arm; a bar extending from one arm to the other and rigidly secured thereto; an end portion of said bar extending forwardly from the adjacent arm and bent rearwardly and outwardly therefrom to form a stop; and a draft device attached to said bar.

WILBUR J. COULTAS.